Dec. 19, 1950     F. J. PERILLO     2,534,731
PROJECTOR STRIPFILM ADVANCING AND FRAMING MECHANISM
Filed Nov. 1, 1947     2 Sheets—Sheet 1
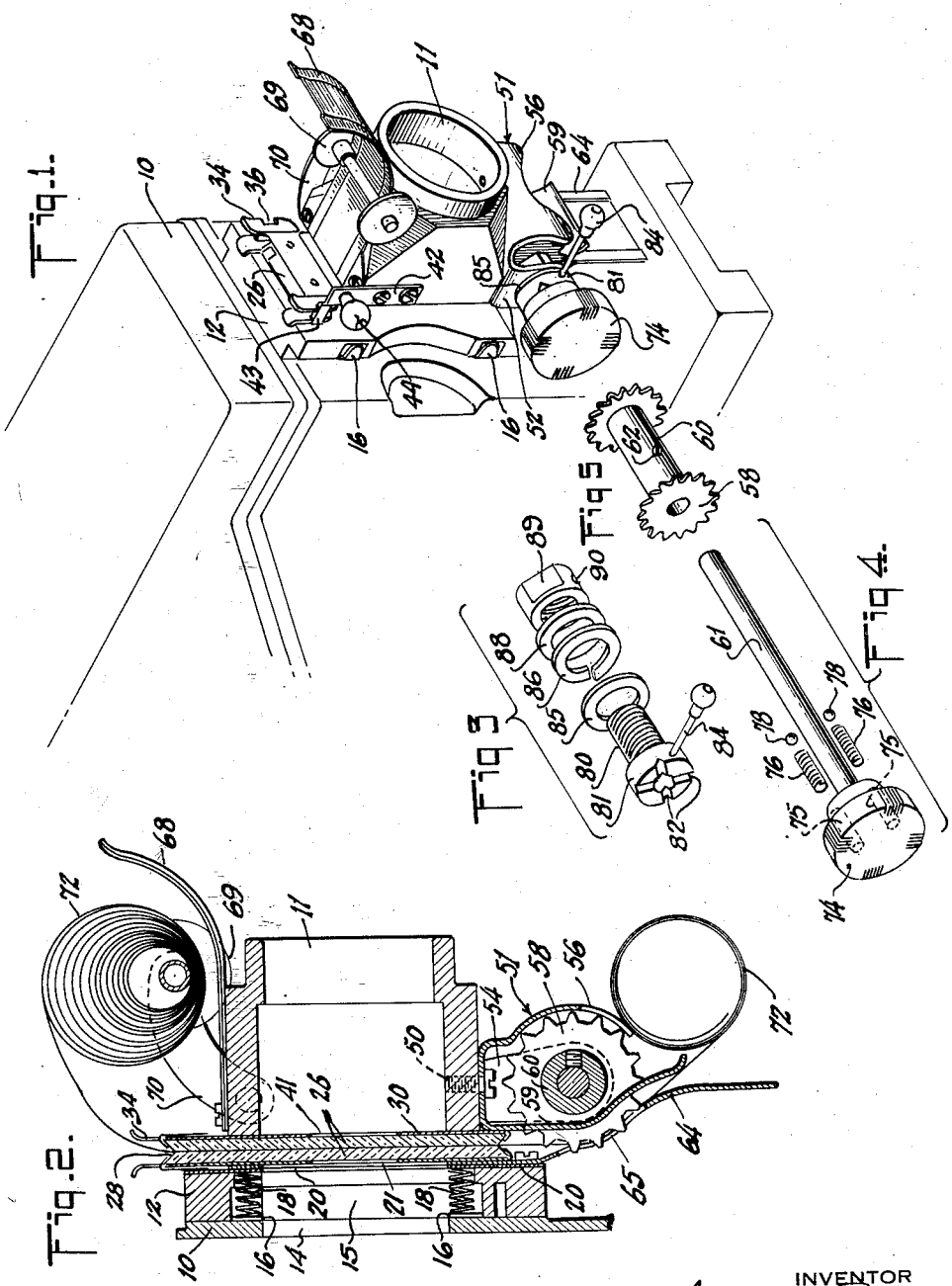
INVENTOR
Florindo J. Perillo
BY
Williams, Rich & Morse
ATTORNEYS Dec. 19, 1950     F. J. PERILLO     2,534,731
PROJECTOR STRIPFILM ADVANCING AND FRAMING MECHANISM
Filed Nov. 1, 1947     2 Sheets-Sheet 2
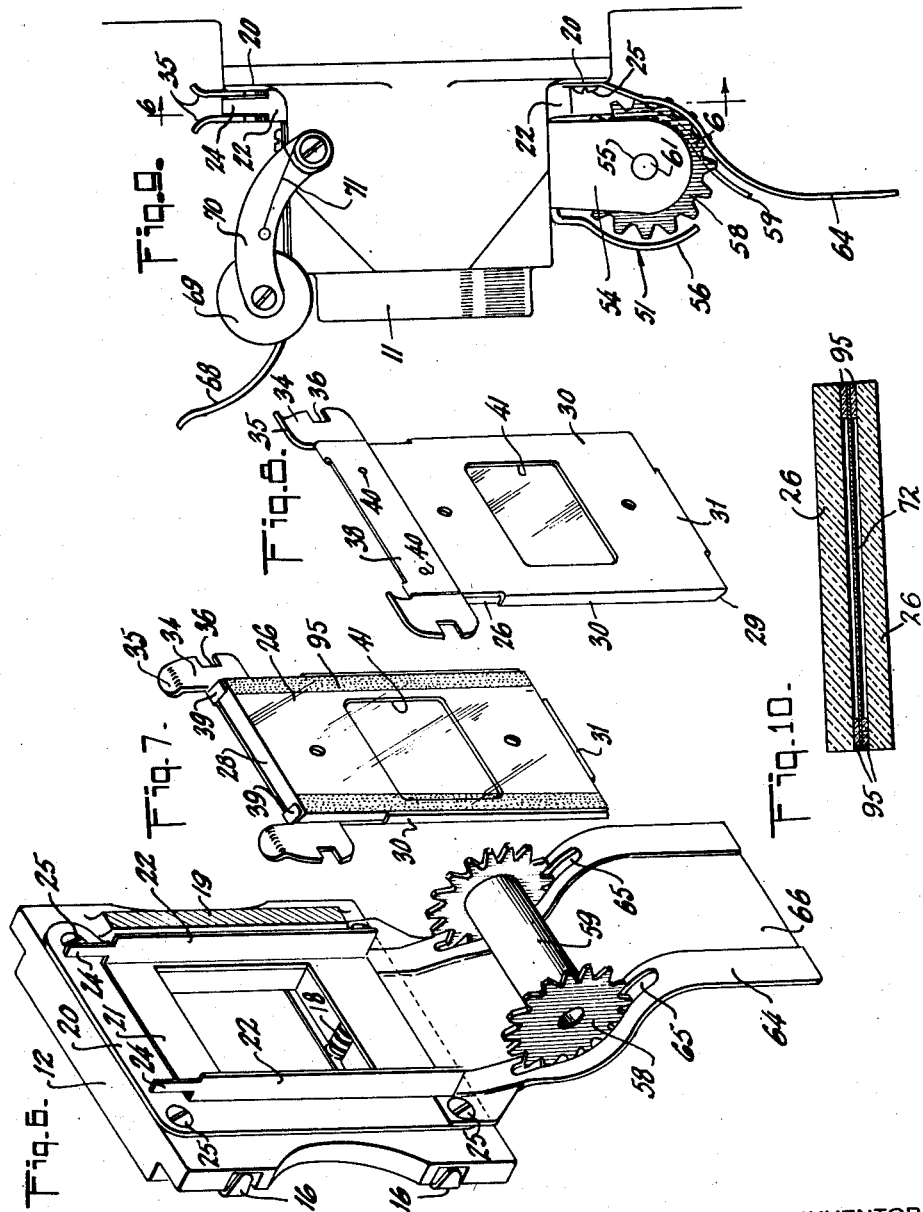
INVENTOR
Florindo J. Perillo
BY
Williams, Rich & Morse
ATTORNEYS

UNITED STATES PATENT OFFICE 2,534,731

PROJECTOR STRIP FILM ADVANCING AND FRAMING MECHANISM

Florindo J. Perillo, Jackson Heights, N. Y., assignor to Viewlex, Inc., Queens County, N. Y., a corporation of New York Application November 1, 1947, Serial No. 783,525

1 Claim. (Cl. 88—28)

This invention relates to apparatus for projecting transparencies on a screen in enlarged form and more particularly to apparatus for positioning and transporting strips of film bearing said transparencies, herein called filmstrips, with relation to the illuminating and lens systems of a projector or the like. The projector is for still pictures, as distinguished from motion pictures.

The filmstrip mechanism of the invention is described herein as applied to a projector of the general type described in my copending application Ser. No. 682,633, filed July 10, 1946, Pat. No. 2,506,168, issued May 2, 1950, and may be combined with the slide positioning structure therein described so as to provide a projector adaptable for use with either slides or filmstrips. Reference is made to the aforesaid application for the details of construction of one form of complete projector with which the present invention may be used.

The objects of the invention are:

To provide step-by-step film transporting mechanism having simple and effective means for "framing" to aline the transparencies with the projection aperture; and To provide such apparatus which is of simple, rugged construction capable of being economically manufactured.

The invention is exemplified by the present preferred embodiment thereof as hereinafter described in conjunction with the drawings in which:

Fig. 1 is a perspective view of the front end of a projector, with lens removed, showing the filmstrip mechanism;

Fig. 2 is a central vertical section through the same showing a filmstrip in position;

Fig. 3 is an exploded view of the parts making up the framing assembly;

Fig. 4 is an exploded view of the sprocket shaft, turning knob, detents and springs;

Fig. 5 shows the drive sprocket;

Fig. 6 is a perspective view showing the film holder guide frame and film guide shoe attached to the lens mount base, the lens mount being cut off in the plane indicated by the line 6—6 in Fig. 9, the sprocket being shown in position;

Figs. 7 and 8 are perspective views of the glass film guides and their holders as seen from opposite sides;

Fig. 9 is a side elevation of the lens mount and filmstrip mechanism; and

Fig. 10 is an enlarged horizontal section, not to scale, through a pair of glass film guides having scratch-preventing film engaging surfaces, a film being shown in position between them.

Referring to Fig. 1, which shows the front end of the lamp housing 10 of a projector, there is attached to this housing a lens mount 11 having a base 12. The front of the housing 10 has an aperture 14 (Fig. 2) through which the light is projected and in front of this aperture is a space 15 into which slides may be inserted. These slides are held flat against the front face of housing 10 by means of pressure bars 16 which are actuated by springs 18, as more particularly described in application Ser. No. 682,633.

The lens mount 11 is attached to its base 12 along one side only, this side being shown in section in Fig. 6 at 19. A space or film channel is thus provided between the front surface of the base 12 and the back surface of the lens mount 11. In this space is a film guide plate holder and guide member consisting of a flat attaching plate 20, and a channel member 21 which is attached to the plate 20, for example, by spotwelding. Both the plate 20 and the member 21 are provided with apertures corresponding in area to the opening 14 in housing 10 to permit the passage of light.

Channel member 21 is provided with side flanges 22 which extend at right angles to the plate 20. The depth of the flanges corresponds to the space between the lens mount 11 and its base 12. At the upper end of each flange 22 is an upwardly extending tongue 24, narrower than the flange, for a purpose to be described later. This assembly is secured to base 12 in any suitable manner as, for example, by means of screws 25.

Referring to Figs. 7 and 8, they show the pair of glass plates, between which the film strip passes, and the sheet metal holders in which the plates are mounted. These two units are identical and the drawings show them in the face to face relation in which they are used. Each consists of a glass plate 26 bevelled at top and bottom as shown at 28 and 29. These plates are mounted in holders 30 which have side flanges 31 and bottom flanges 32. The top of each holder 30 is provided on either side with ears 34 the tops of which are bent over at 35 so that the holder may be easily gripped. In the side of each ear is a notch 36. The holders 30 are made of relatively stiff sheet metal and to secure the glass plates 26 therein each holder has fastened to it, parallel to its top edge, a retaining strip 38 of thinner, softer metal having bendable ears 39. The strips and holders may be joined by spotwelding as indicated at 40. Each holder 30 is provided with a rectangular aperture 41 which, in the embodiment shown, corresponds in size to a "single frame" picture, that is to say about 18 mm. by 24 mm. The glass plates are assembled in their holders by positioning them between the flanges 30 and 31 and thereafter bending the ears 39 down so that they overlap the upper bevels 28.

The holders just described are positioned during use between the flanges 22 of channel member 21, as may be seen in Figs. 1, 2 and 9. They are dimensioned relative to the space between lens mount 11 and the intermediate portion of member 21 so that there is just sufficient room between the plates 26 to receive a film strip without binding, thus assuring the flatness of the film during projection. The holders hang between flanges 22 and are supported on the upper edges thereof by the ears 34. The ears of the two holders are positioned on opposite sides of the tongues 24 which may, if desired, be of such dimension as to slightly separate the glass plates 26 at their upper edges. In any case, the tongues 24 serve to maintain a single holder in its proper place if the other holder is removed and to prevent a holder being inserted backward.

Referring to Fig. 1, a detent in the form of spring arm 42, which is fastened to lens mount 11, has a tongue 43 which engages the notches 36 of one pair of ears 34. The bottom edges of these ears are rounded so as to snap over the tongue 43 when the holders 30 are inserted and when it is desired to remove the holders, spring 42 may be flexed by pressure on the knob 44 attached to the side of the spring arm.

Attached to the underside of lens mount 11 by means of screws 50 (Fig. 2) is a sprocket mounting bracket 51 which has depending legs 52 and 54, the latter being provided with a hole 55 (Fig. 9). The front part of bracket 51 is bent downwardly at 56 so as to form a guard over the sprocket 58. Optionally, the bracket 51 may be provided with a rear extension 59 which is bent downwardly and forwardly around the hub 60 of sprocket 58, and serving to direct film issuing below the sprocket so as to prevent its following around the sprocket under the portion 56 of bracket 51, as may otherwise happen in the case of film which has been tightly curled.

Referring to Figs. 4 and 5, sprocket 58 is supported on a shaft 61 which passes through the hub 60 of the sprocket. The sprocket is fixed on the shaft by means of a set screw 62.

Extending downwardly and forwardly behind sprocket 58 is a film guiding shoe 64 provided with short longitudinal slots 65 through which the teeth of the sprocket project. The sprocket is so mounted relative to the shoe 64 that film passing over the surface of the shoe, as shown in Fig. 2, will have its sprocket holes engaged by the teeth of sprocket 58. Preferably, the central portion of shoe 64 is depressed, as shown at 66 (Fig. 6), so that frictional engagement between the shoe and the film is limited to the portions of the film adjacent the sprocket holes, thus preventing scratching of the film in its picture area. Shoe 64 is supported on the bottom portion of base 12, preferably by two of the screws 25 which are used to secure the plate 20.

Means for securing a coil of film are provided on the upper part of the lens mount 11, as shown in Figs. 1, 2 and 9, consisting of a film cradle 68 upwardly curved at its outer end and having a surface contour similar to shoe 64 and a film spool 69 supported above the cradle on a pivoted arm 70 which is pressed downwardly by a spring 71. In use, a coil of film, shown at 72, is slipped under the spool 69 which holds it against the cradle 68 with just enough pressure to prevent the coil from unwinding. Spool 69 may be either rotatably or fixedly mounted with reference to arm 70 since the film is not attached to the spool. In Fig. 2 spool 69 is shown slightly raised but when released it will press down against cradle 68 as shown in Figs. 1 and 9.

Referring to Figs. 3 and 4, the mechanism for feeding the film through the projector step-by-step and for initially framing the pictures on the film with reference to the apertures 41 in the holders 30 is constructed as follows: Shaft 61 is provided at one end with a knob 74 in which are drilled a pair of diametrically opposite holes 75. Each hole receives a spring 76 and a ball 78. Inserted through a clearance aperture in the leg 52 of bracket 51, in alinement with the hole 55 in leg 54, is a threaded sleeve 80 having a head 81 provided with crossed notches 82 disposed at right angles to each other. Mounted in head 81 is a lever 84. When sleeve 80 is assembled in leg 52, a friction washer 85, of fiber or the like, is inserted between the head 81 and the leg 52. On the other side of leg 52, on the sleeve 80, is a spring lock washer 86, another friction washer 88 and a nut 89 provided with a set screw 90. Nut 89 is tightened on sleeve 80 sufficiently to hold the sleeve stationary during rotation of shaft 61 but with sufficient looseness so that sleeve 80 can be rotated by lever 84. After the assembly shown in Fig. 3 is attached to the bracket 51, the sprocket 58 is inserted between the legs of the bracket and shaft 61 is inserted through sleeve 80, sprocket 58 and hole 55. The sprocket is fastened on the shaft so that one end bears against the face of nut 89 and holds knob 74 inwardly against the head 81. As the knob is rotated the balls 78, under the influence of the springs 76, drop into the notches 82. Thus at each quarter turn of the knob the balls drop into the notches giving the sprocket four positive stopping positions during each revolution. The sprocket is of such size that each quarter turn advances the film one frame. It will be appreciated that the springs and balls could be carried in head 81 and the cooperating notches placed in knob 74, if desired, or that a single spring and ball may be used.

From the foregoing description the operation of the device should be apparent. Film is placed on the upper cradle 68 under the spool 69 and the free outer end is introduced between the top edges 28 of the glass plates 26 and pushed downwardly into engagement with the sprocket. Upon counterclockwise rotation of the latter, as viewed from the knob end, the teeth of the sprocket engage the sprocket holes in the film and draw it downwardly. The threading of the film onto the sprocket is automatic. When the first picture or a part thereof appears before the apertures 41 and the balls 78 are in engagement with one pair of notches 82, if the picture is not properly framed it may be brought into alinement with the apertures by movement of the lever 84, which rotates sleeve 80 carrying with it the knob 74. It will be evident that movement of the lever 84 through an arc of 90 degrees produces the same result as a quarter revolution of the knob and that the maximum movement of the lever required to frame a picture will never be more than 45 degrees.

It will be noted that the upper edges 28 of the glass plates 26 are exposed so that when the projector light is turned on the light diffused through the glass plates renders the top edges thereof luminous, making it very easy in a darkened room to see where the film should be inserted. The bevelled top edges 28 form a V into which the film end is introduced.

The snap action and positive stopping, produced by the coaction of the spring pressed balls 78 and the notched head 81, make possible very rapid and accurate transport of the film, it being quite possible to move from one picture to the next faster than the eye can follow without any overrunning of the picture relative to the aperture. The apparatus works equally well in either direction and the balls 78 reduce friction to a minimum.

It should also be noted that the film strip mechanism, which is adapted for use with pictures of a single frame size, is illustrated as incorporated in a projector adapted for use with slides having a double frame size in such a manner that the apparatus is quickly converted for use with slides merely by removing the two film positioning elements shown in Figs. 7 and 8. It will also be noted that these elements are positioned in a plane farther from lamp housing 10 than is the slide space 15. This is done for the reason that the converging cone of light issuing from the condenser system in the housing 10 is more concentrated as it approaches the lens and since the film strip carries smaller pictures than the slides, these pictures will be more brilliantly illuminated by being placed farther from the light source.

Referring to Figs. 7 and 10, the glass plates 26 may, in their simplest form, have plane surfaces but, as shown, these surfaces are modified so as to provide raised portions along the outer opposed edges of the plates. These raised portions are shown as the strips 95 which are applied along the outer portions of one surface of each plate. These strips may be about $\frac{1}{16}$ of an inch wide and from .003 to .005 of an inch thick. They contact the film outside of its picture area and serve to space the picture-carrying portion of the film from the surfaces of the plates so as to prevent scratching due to hard dust particles which may get between the film and the plates.

Strips 95 are preferably of ceramic material which is applied to the desired areas of the plates 26 and thereafter fused or fired into the glass. Various methods of applying the strips may be used including painting, printing and the decalcomania process. Considerable latitude in the thickness of the strips is permissible up to about .012 inch without giving the film such freedom of movement that it may buckle and throw the projected picture out of focus. The fused ceramic strips are hard and smooth and provide good bearing surfaces for the film.

Subject matter disclosed but not claimed herein is claimed in my co-pending application Ser. No. 89,630, filed April 26, 1949 as a continuation-in-part hereof.

While the invention has been described by reference to a particular embodiment thereof, it is not to be construed as limited thereto since many changes in detail may be made without departing from the spirit of the invention as defined in the claim.

What is claimed is:

In a projector for filmstrips, film advancing and framing mechanism comprising a support having spaced apart legs, said legs having aligned openings therein, a hollow externally threaded sleeve having an enlarged head at one end rotatably positioned in one of said openings with the said head on the outside of the leg, a nut threaded on said sleeve, friction members including a resilient member positioned on said sleeve and bearing against the leg in which said sleeve is mounted and adapted to be compressed between said head and said nut, a shaft extending through said sleeve and the other of said openings and rotatable therein, a sprocket secured to said shaft between said legs, a knob on the outer end of said shaft having a face in abutting relation to the face of said head, the face of said head adjacent said knob having spaced notches, said knob having a recess, a spring pressed detent in said recess adapted to engage said notches, and a lever secured to said sleeve for rotating it, whereby said sleeve, said knob and said sprocket can be moved as a unit to frame a picture.

FLORINDO J. PERILLO.

REFERENCES CITED

The following references are of record in the file of this patent:

UNITED STATES PATENTS

| Number | Name | Date |
|---|---|---|
| 1,704,814 | Wellman | Mar. 12, 1929 |
| 1,727,900 | Patterson | Sept. 10, 1929 |
| 1,738,762 | De Vault | Dec. 10, 1929 |
| 2,033,038 | Lee | Mar. 3, 1936 |
| 2,037,454 | Boecking | Apr. 14, 1936 |
| 2,126,474 | Kleerup | Aug. 9, 1938 |
| 2,172,256 | Nagel | Sept. 5, 1939 |
| 2,243,160 | Koehl | May 27, 1941 |
| 2,251,077 | Stanton | July 29, 1941 |
| 2,303,633 | Guercio | Dec. 1, 1942 |
| 2,330,709 | Harper et al. | Sept. 28, 1943 |
| 2,374,486 | Howell | Apr. 24, 1945 |
| 2,438,710 | Larson | Mar. 30, 1948 |

FOREIGN PATENTS

| Number | Country | Date |
|---|---|---|
| 229,572 | Great Britain | Feb. 26, 1925 |